US007841007B2

(12) United States Patent
Currie et al.

(10) Patent No.: US 7,841,007 B2
(45) Date of Patent: *Nov. 23, 2010

(54) METHOD AND APPARATUS FOR REAL-TIME SECURITY VERIFICATION OF ON-LINE SERVICES

(75) Inventors: David Currie, San Francisco, CA (US); Kenneth Leonard, Hillsborough, CA (US); Benjamin Tyler, San Mateo, CA (US)

(73) Assignee: ScanAlert, Napa, CA (US)

( * ) Notice: Subject to any disclaimer, the term of this patent is extended or adjusted under 35 U.S.C. 154(b) by 1045 days.

This patent is subject to a terminal disclaimer.

(21) Appl. No.: 10/674,878

(22) Filed: Sep. 29, 2003

(65) Prior Publication Data

US 2005/0160286 A1      Jul. 21, 2005

Related U.S. Application Data

(63) Continuation-in-part of application No. 10/113,875, filed on Mar. 29, 2002.

(51) Int. Cl.
*G08B 23/00* (2006.01)
(52) U.S. Cl. .......................................... 726/25; 726/3
(58) Field of Classification Search .................. 726/25
See application file for complete search history.

(56) References Cited

U.S. PATENT DOCUMENTS 6,658,394 B1 *   12/2003   Khaishgi et al. .............. 705/58
6,721,721 B1 *   4/2004    Bates et al. .................... 707/1
6,785,732 B1 *   8/2004    Bates et al. .................. 709/232
6,879,978 B2 *   4/2005    Yoshiura et al. ............... 707/3

(Continued)

FOREIGN PATENT DOCUMENTS

WO       WO 98/00784       1/1998

(Continued)

OTHER PUBLICATIONS

Guirguis, Ragi; "Network- and Host-Based Vulnerability Assessments: An Introduction to a Cost Effective and Easy to Use Strategy"; GIAC Security Essentials (GSEC) Practical, Version 1.4b, Publication Data: Jun. 14th, 2003.*

(Continued)

*Primary Examiner*—Kimyen Vu
*Assistant Examiner*—Yogesh Paliwal
(74) *Attorney, Agent, or Firm*—Zilka-Kotab, PC

(57) ABSTRACT

A unique combination of several functions achieves a system by which consumers can validate the actual security status of a website before they decide to trust it, and therefore transact with it. In one example implementation, a security system includes a scanning engine that periodically and thoroughly scans the network and connected components of an on-line service such as a website. The results are stored and perhaps reported back to the service via alerts and the like. The website includes a "bug" which visitors can click on. The visual appearance of the "bug" can be altered (e.g. made invisible) in accordance with a determined level of security for the website. By clicking on the "bug," the visitors can also be displayed web pages showing the security status of the website. Based on their review of such web pages, visitors can then decide whether to trust the website for further transactions.

20 Claims, 8 Drawing Sheets

U.S. PATENT DOCUMENTS

| | | | |
|---|---|---|---|
| 6,895,551 B1 * | 5/2005 | Huang et al. | 715/513 |
| 6,996,845 B1 * | 2/2006 | Hurst et al. | 726/25 |
| 2002/0010855 A1 * | 1/2002 | Reshef et al. | 713/164 |
| 2002/0038430 A1 * | 3/2002 | Edwards et al. | 713/200 |
| 2002/0104023 A1 * | 8/2002 | Hewett et al. | 713/201 |
| 2002/0129161 A1 * | 9/2002 | Lloyd et al. | 709/238 |
| 2003/0028803 A1 * | 2/2003 | Bunker et al. | 713/201 |
| 2003/0050970 A1 * | 3/2003 | Akiyama | 709/203 |
| 2003/0097591 A1 * | 5/2003 | Pham et al. | 713/201 |
| 2003/0154269 A1 * | 8/2003 | Nyanchama et al. | 709/223 |
| 2003/0233581 A1 * | 12/2003 | Reshef et al. | 713/201 |
| 2004/0078564 A1 * | 4/2004 | Abdulhayoglu | 713/156 |
| 2004/0088581 A1 * | 5/2004 | Brawn et al. | 713/201 |
| 2004/0243802 A1 * | 12/2004 | Jorba | 713/168 |

FOREIGN PATENT DOCUMENTS

| | | |
|---|---|---|
| WO | WO 03/084182 | 10/2003 |

OTHER PUBLICATIONS

Tiso, John; "Automated Security Scanning"; Sys Admin, vol. 9, Issue 10, pp. 73-78, Publication: Oct. 2000.*

Nessus Scan Report: retrieved from: http://web.archive.org/web/20001217231600/www.nessus.org/demo/report.txt, Publication: 2000.*

Blyth, Andrew; "An XML-based architecture to perform data integration and data unification in vulnerability assessments", Information Security Technical Report, vol. 8, Issue 4, Apr. 2003, pp. 14-25.*

"Tenable Network Security," copyright 2002-2008 Tenable Network Security, www.nessus.org/nessus/.

International Search Report and Written Opinion from PCT Application No. PCT/US04/32100 mailed on Feb. 8, 2005.

Examination Report from GB Application No. GB0606095.8 mailed on Sep. 8, 2006.

* cited by examiner

METHOD AND APPARATUS FOR REAL-TIME SECURITY VERIFICATION OF ON-LINE SERVICES

CROSS-REFERENCE TO RELATED APPLICATIONS

The present application claims priority from, and is a continuation-in-part of, U.S. patent application Ser. No. 10/113,875, filed Mar. 29, 2002 and entitled "Method and Apparatus for Real-Time Security Verification of On-Line Services," commonly owned by the present assignee, the contents of which are incorporated herein by reference.

FIELD OF THE INVENTION

The present invention relates generally to security verification, and more particularly, to a method and apparatus for providing real-time third-party verification of the security status of a website or other on-line service.

BACKGROUND OF THE INVENTION

Although e-commerce has grown exponentially in the recent past, problems that limit future growth remain. For example, many consumers who would otherwise be willing to transact or provide private information about themselves on-line do not do it because they are afraid that the Website operator has not taken sufficient security means to protect their private information such as their name, address, buying habits and credit card information.

FIG. 1 is a top-level block diagram illustrating an example environment of the invention. As shown in FIG. 1, the environment includes an on-line service 102 having one or more websites 104, and visitors 106 that access the website(s) of the on-line service via a network 108 such as the Internet. Only one service 102 and visitor 106 are shown in FIG. 1 for clarity of the invention. However, those skilled in the art will understand that there can be dozens, hundreds, thousands, and/or millions of each, depending on the type of network 108 involved.

On-line service 102 is typically an ecommerce operator, or other Internet or network service that obtains and/or maintains private or confidential information about consumers. Such service is interested in removing the fear and objections consumers may have about transacting with or sharing their personal information with the website(s) 104. Accordingly, service 102 may perform its own security oriented scans of the website and use the results to ensure that consumer information is secure. For example, such scans may be designed to detect vulnerabilities to threats such as hackers gaining access to the website(s) systems to deface the website, defraud the website's visitors or steal valuable information about the website or its visitors.

Visitor 106 is a consumer or other interested party visiting, or contemplating visiting, website(s) 104 or other Internet service provided by service 102 via a PC and a modem, web kiosk or other Internet access device. Visitor 106 can be a consumer or other interested party (not necessarily an individual consumer) interested in purchasing or in some way transacting with the service 102's on-line store, service or information base. Visitor 106 may not inherently trust on-line services and websites to protect their private and personal identifying, credit card, financial, medical or other information with sufficient security precautions to ensure its privacy and safety, and, indirectly the safety of the visitor.

Website 104 includes conventional system components for delivering on-line services to the visitor. As will be understood by those skilled in the art, components of website 104 can include, but are not limited to:

Servers, such as the Sun e220R, Dell 5500, or other computer system involved in providing a part of the service.

Network Components, such as network routers switches and Hubs.

Firewalls, such as Checkpoint, or Firebox

Operating Systems, such as Windows NT, Redhat Linux, or Sun Solaris

Licensed technology components and applications, such as web servers and application servers, e-commerce applications, RDBMS database engines, etc.

Customer written applications such as shopping carts, information systems containing private information about Visitors and other application components.

Network operating systems and protocols, such as SNMP, ICMP, TCP, IP, DHCP, IIOS and the like.

Some attempts have recently been made to provide security verification so as to promote confidence in visitors 106 for conducting e-commerce and other transactions with services 102. For example, Verisign and Truste allow on-line services to place a seal (e.g. an image created by a .GIF or other image file) on their websites if they have purchased their products, but do not do any actual security testing of the sites themselves. Accordingly, such seals do not truly indicate the vulnerability of the services 102 to hacking, cracking, worms, trojans, or similar security vulnerabilities. Further, such seals do not themselves appraise visitors of the security of data held on the website 104, or otherwise audit the security precautions of services 102 in any way.

For example, Verisign does not scan their customers' servers for any security vulnerabilities. In fact, Verisign does not even verify the proper installation of the Verisign digital certificate (a string of numbers which is a public key infrastructure (PKI) encryption technology) or use of secure sockets layer (SSL) to ensure the security of a visitor's transaction packets. As set forth above, the Verisign seal itself does nothing to verify to visitors 106 that the services 102 are not vulnerable to hacking, cracking, worms, trojans or similar security vulnerabilities. A user can click on the Verisign seal and Verisign will merely display a single web page showing that the service 102 has purchased a Verisign digital certificate or other product and that Verisign has verified their identity.

Similarly, Truste does not test the security of the networks and servers that operate the ecommerce systems that use their seal. When a Truste seal is purchased, Truste will merely verify that the service's privacy policy meets the Truste requirements and will look at the website to verify that it appears to comply with that policy, but will not otherwise check the actual security of the servers and networking equipment which deliver the services 102.

As another example, some attempts have been made to provide third-party verification of on-line services, such as verification services performed by Qualys. Such third-party verification services may use open source tools such as those provided by www.nessus.org. However, Qualys and others do not offer a seal or other means for visitors 106 to access the results of such verification services or to otherwise verify the actual security of the services 102. Furthermore, Qualys and others do not check for potential new server vulnerabilities between automated security checks of the website 104 used to operate the services 102. For example, scans may only be performed on a periodic or infrequent basis, while potential new security threats, such as worms, may arise several times a day. There is currently no way for such third-party approaches to alert services 102 of such potential new threats between scans.

In summary, none of the above conventional approaches are entirely trustworthy, do not adequately check and alert service 102 of potential new threats between security scans and/or are directly available to visitors 106.

SUMMARY OF THE INVENTION

The present invention relates to security verification, and more particularly, to providing third-party verification of the security status of on-line services.

The present invention uniquely combines several functions to achieve a security verification system by which consumers can validate the actual security status of a website before they decide to trust it, and therefore transact with it. In one example implementation, a security system includes a scanning engine that periodically and thoroughly scans the network and connected components of an on-line service such as a website. The results are stored and perhaps reported back to the service via alerts and the like. The website includes a "bug" which visitors can click on. By clicking, the visitors are also displayed web pages showing the security status of the website. Based on their review of such web pages, visitors can then decide whether to trust the website for further transactions.

In accordance with another example implementation of the invention, the components of on-line services are stored and compared to fingerprints of potential new vulnerabilities when they arise. Depending on whether the fingerprints match the components of the on-line services, alerts to the on-line services can be generated without performing actual scans.

In accordance with a further example implementation of the invention, the security verification system maintains security meters for one or more on-line services which can be accessed by visitors. For example, the security verification system can maintain and provide security scores and corresponding graphical indicators of individual security attributes, both current and/or historical, of one or more on-line services.

In accordance with a still further example implementation of the invention, the appearance of a "bug" to visitors of a Web site is controlled in such a way that it seems to appear or disappear, or have its appearance altered, as an indicator of the Web site either having passed or not passed a certain threshold of security audit. This is accomplished by causing the "bug" to be displayed only when certain security audit criteria, or security status level, is met, and causing, for example, a single-dot "clear" image, or other altered image, to be displayed in its place when these security criteria are not met. The result is a simple, yet easy to understand, indication of the security status of the site being visited, by either the appearance of, or absence of, the bug.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
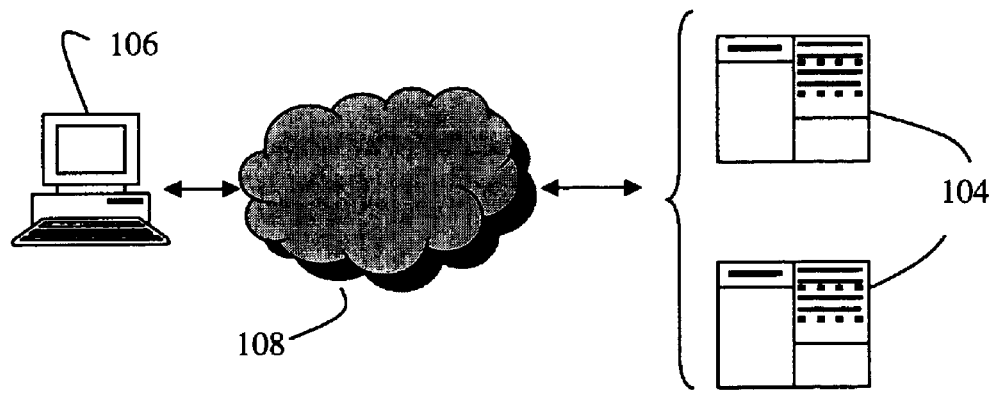
FIG. 1 is a top-level block diagram illustrating an example environment of the invention.
Figure 2:
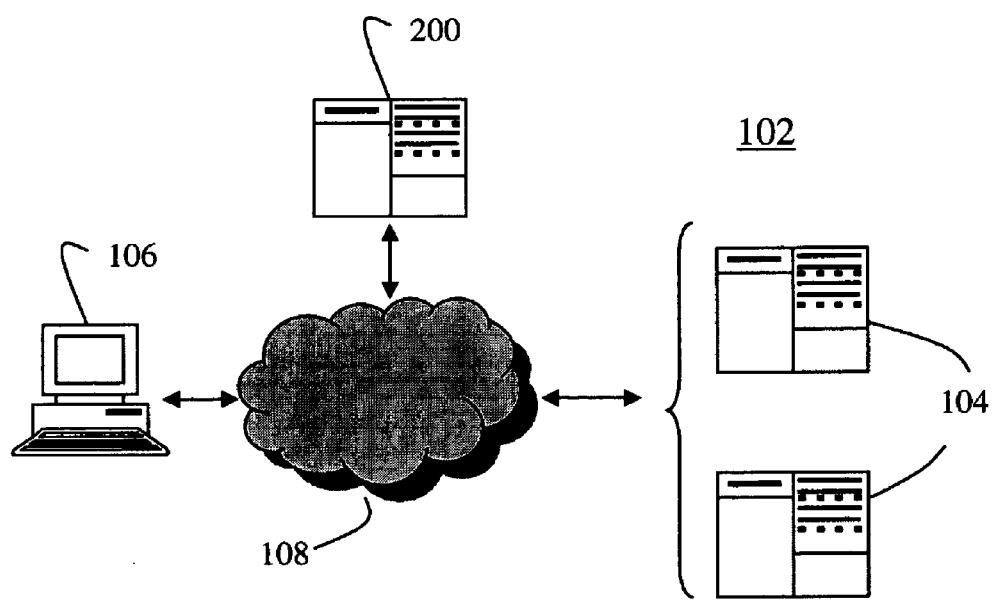
FIG. 2 is a top-level diagram illustrating an example environment and implementation of the invention.

FIG. 2 is a top-level diagram illustrating an example environment of the invention. As shown in FIG. 2, the on-line environment further includes security system 200. Generally, on-line service 102 has entered into an agreement with the security system to perform third-party security verification services for one or more website(s) 104 they operate, the results of which are further available for viewing by its visitors 106 in a simple manner as described in more detail below.

Preferably, system 200 is functionally and physically separate and remote from on-line service 102 (i.e. exists at a totally separate and unrelated IP address on network 108 from service 102, and the system 200 is not corporately or otherwise controlled in any way by the same entity as the service 102). In other words, system 200 should only have the level and type of public and/or network access to service 102 that hackers and other threats have. This functional, physical, managerial, administrative and corporate separation provides a level of confidence to visitors 106 of independent and informed security verification that has been heretofore unavailable to them.

Figure 3:
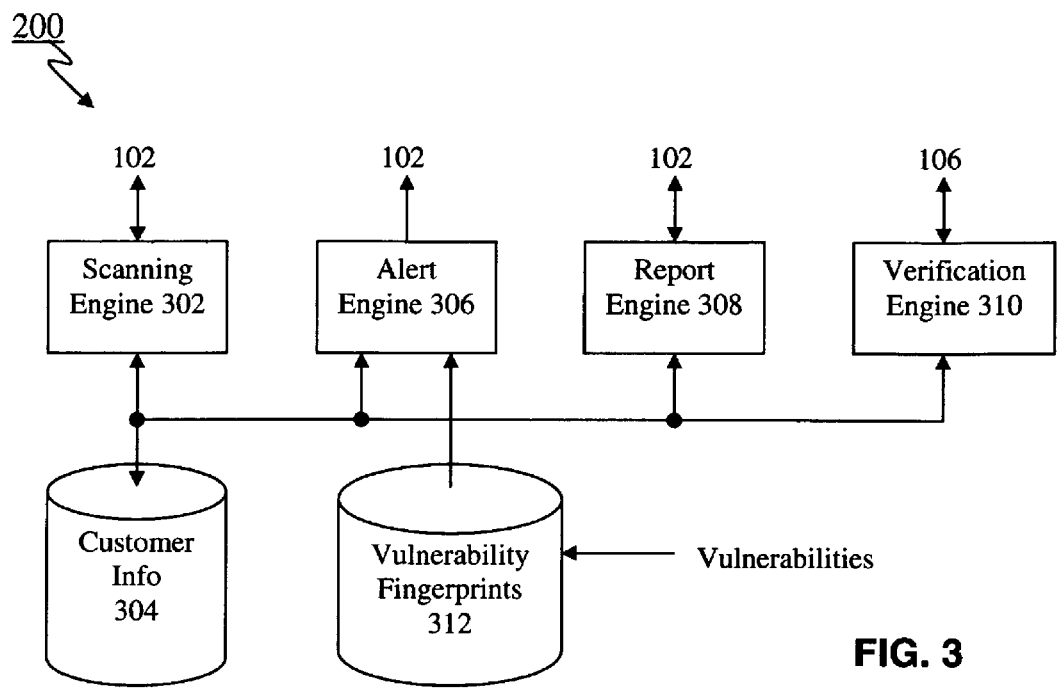
FIG. 3 is a block diagram illustrating an example implementation of security system in accordance with the invention in even further detail.

Generally, security system 200 includes components to deliver third-party security verification services to both on-line service customers (e.g. service 102) and visitors 106. FIG. 3 is a block diagram illustrating an example implementation of security system in even further detail.

As shown in FIG. 3, this example of security system 200 includes the following components: scanning engine 302, customer information database 304, alert engine 306, reporting engine 308, and verification engine 310. It should be noted that system 200 can include many other conventional and novel components and functionalities such as providing system manager access and providing web server and other network access, as well as other storage and processing capability. However, even further detailed descriptions of such components and functionalities will be omitted here so as not to obscure the invention.

In one example implementation, security system 200 is implemented as a Sun computer running Solaris. In such an implementation, engines 302, 306 and 308 are real-time software processes developed using Java. Database 304 may be implemented using a database or a flat memory and/or other known equivalents.

Scanning engine 302 can include any conventionally known remote security scanner or equivalent thereof, such as the open source Nessus engine (details available from www-.nessus.org), that remotely obtains and produces information about open ports, available services, network protocols, security exposures and vulnerabilities existing on a server or other device that is available over a network. Accordingly, scanning engine 302 periodically checks the web servers and/or network devices of service 102 to discover website component configuration and vulnerabilities. Scanning engine 302 initially scans the open ports of devices registered in customer information database 304. In one example implementation such as the Nessus open source engine, the scanning process produces a set of XML files containing all information gathered during the scan. These files are parsed by scanning engine 302 and stored in database 304, the records of which are associated with the customer account number and therefore the customer's registration information.

As set forth above, scanning engine 302 stores information about the open ports, security exposures and vulnerabilities and scans completed on a server or other network device, and associates the information with a specific customer (e.g. website operator 102). Customer information database 304 stores information about each customer service 102's company, users, website(s), and the scans performed on the website(s) or other devices associated with the website(s). Stored information includes a scan header record including the date, launch time, duration, and number of vulnerabilities classified by severity level. The stored information also includes information about what sockets are open on the scanned device, what generic services should be running on those ports, and what services are actually running on the open ports including version, network message protocol and other available information.

Alert engine 306 is a service that alerts services 102 that are customers of system 200 about potential or confirmed security vulnerabilities by sending emails and/or reporting such events online. Such alerts can be based on device and/or service information found during a scan as compared to vulnerabilities associated with such devices and/or services stored in database 312. In accordance with a further aspect of the invention, alerts can also be generated by comparing and matching existing service 102 information stored from previous scans against information about a newly discovered vulnerability. Such newly discovered vulnerabilities can be retrieved by the system and parsed into vulnerability fingerprint records and stored in database 312. These records include the devices or services that pertain to the vulnerabilities. When a new vulnerability record is entered into database 312, and if there is a possibility that the new vulnerability could present a security problem for the customer's service 102, alert engine 306 can then generate an alert to service 102.

In one example implementation, alert engine 306 includes an email server with inboxes maintained for one or more users of each registered service 102. Alert engine 306, when it generates alerts, places them in the inboxes and notifies such users in accordance with preferences and thresholds associated with each user. The email server of alert engine 306 includes functionality for allowing users to access, view and delete their email alerts from their inboxes. Alert engine 306 can also be configured to send an email to any valid email address. It should be noted that although email is one possible notification method, that other automated notification techniques such as paging, instant messaging, or voice messaging over telephone, could be employed.

The customer information database 304 contains account information as well as scan information about the devices of services 102 that are registered with the system 200. Users of such registered services 102 can log in and review interactive reports about the scans contained in the system, for example. Reporting engine 308 generates tables, graphs and content viewed provided in the interactive reports based on information in database 304. In one example, reporting engine 308 provides such reports to users and/or administrators of service 102 using a web server interface, for example.

It should be noted that information in customer information database 304 and vulnerability fingerprint database 312 may be initialized in many ways, both manually (via a system manager, for example) and automatically, and example implementation details thereof will be described in more detail below. Moreover, security information in database 304 need not only include information that is automatically detected and input by scanning engine 302. In addition to initialization information provided by a system manager, a system manager or other authorized party of service 102 can provide other manual inputs into database 304. For example, service 102 may employ a consultant or other third party to periodically audit the service's security practices, such as password policies, network architecture, internal and external security policies, proper enforcement of those policies, employee termination policies and other indicators that might affect the security of service 102 but cannot be automatically collected via scanning engine 302. Database 304 may include fields for such additional information, which fields can also be accessed by the alert engine, report engine and verification engine for generating alerts, reports and security ratings as will be explained in more detail below. Accordingly, this should be considered an alternative or additional embodiment of the invention.

It should be noted that system 200 may further include functionality for allowing services 102 to notify system 200 of false positives. For example, if an alert email is sent of a detected vulnerability, and the service 102 determines that the alert was not an actual threat, it can notify the system to ignore that vulnerability until it is no longer found on the affected device. If the vulnerability identified by the service 102 as a false positive stops appearing after a predetermined number of scans or elapsed time, it will no longer be flagged as a false positive and will be totally removed as a potential vulnerability. If it does appear again, service 102 will be alerted again, and the service 102 will have to check again if the vulnerability is a false positive, and report back to the system 200 accordingly.

The particular method of allowing a service 102 to identify vulnerabilities can be implemented in a number of ways. For example, the system 200 can have an administrator interface that allows an administrator to receive and review return emails from the service 102 and manually update the database. As another example, the system 200 (e.g. the report engine 308) can include a web server interface that provides pages and associated scripts (e.g. scripts associated with checkboxes appearing next to reported vulnerabilities) for allowing users of services 102 to view and correct system vulnerability reports.

Verification engine 310 provides security status information of registered services 102 to visitors 106. For example, once the scanning engine 302 has completed the scanning process and results of the process have been uploaded, the customer information database 304 is updated with a security status. In one example implementation, a service 102 that has been registered with system 200 places a "Bug" (e.g. a GIF or other image file with an associated URL or script, i.e. hyperlink) in web pages presented by its website(s) 104. Such a "Bug," when clicked, causes an HTTP request to be sent to the verification engine 310. Verification engine 310 responds by determining the particular service 102 corresponding to the HTTP request, retrieving the security status of the corresponding service 102 from database 304, and displaying a page of information containing the security status of the corresponding service 102 to the clicking visitor 106.

In a further example implementation, rather than just presenting the saved security status from database 304 to the visitor 106, the security status presented to visitor 106 can be extrapolated to the moment of the visitor's request. Such an up-to-date security status can be derived by checking the number of vulnerabilities over a certain severity level stored in database 304 for the requested service 102 and applying a grace period for the service 102 to resolve the problem. If sufficient vulnerabilities exist for a long enough period of time, for example, a non-encrypted FTP service is running on the website 104 for more than 48 hours, the security status of service 102 can be downgraded. When vulnerabilities are resolved or are identified by service 102 as false positives, the security status is automatically upgraded and displayed the next time a visitor 106 clicks on the Bug found on pages presented by the website 104 of service 102.

It should be noted that security status information can be provided to visitors of website 104 in a variety of ways in addition to a bug provided on a page of website 104 that clicks through to a simple rating page. For example, verification engine 310 can cause the bug to click through to a detailed security meter page such as will be described in more detail below. As another example, the verification engine 310 can cause an up-to-date security status to be provided directly on the page in place of the bug, for example by continuously updating a GIF file accessed by the website. Even further alternatives will occur to those skilled in the art after being taught by the present examples, and these should be considered even further additional or alternative embodiments of the present invention.

Examples of methods implemented by security system 200 in accordance with the security verification features of the invention will now be described with reference to the accompanying drawings.

Figure 4:
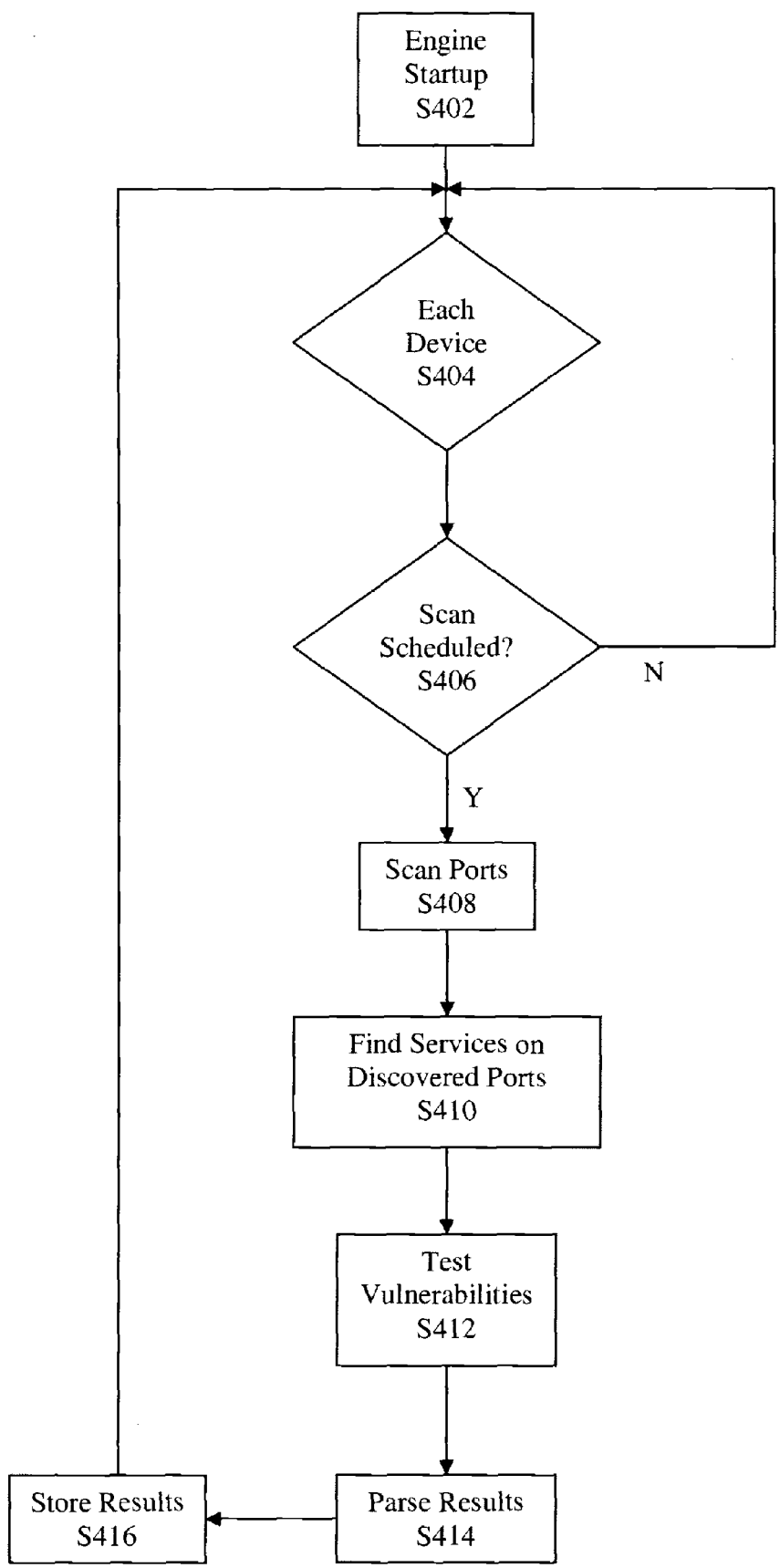
FIG. 4 is a flow diagram illustrating an example of processing steps performed by the scanning engine according to an aspect of the invention.

FIG. 4 is a flow diagram illustrating an example of processing steps performed by the scanning engine according to an aspect of the invention. For ease of illustration, processing for scanning only one registered service 102 will be described, however those skilled in the art will understand that multiple threads can be assigned for multiple services 102, for example.

The following scanning engine processing examples are consistent with the GPL licensed Nessus project vulnerability scanning engine, used in one example implementation of the invention to gather security information about a remote service 102. Complete specification details, source code and a list of vulnerabilities scanned by Nessus are found in web pages located at www.nessus.org, which pages are incorporated herein by reference. It should be noted, however, that many additional implementation details of the scanning engine described below, such as the scheduler approach and the process of storing the scan results in the customer information database, are aspects of the present invention. These and other aspects of the invention will become more apparent from the descriptions provided hereinbelow.

At engine startup (step S402), the ports scanner creates several worker daemons that all interact with common log, dump and other system files. These daemons request test jobs from a worker manager process which manages the queue and can run many tests for one or more devices in parallel.

Generally, the scanning engine is invoked for each device the customer service 102 has registered in the customer information database 304 according the schedule requested for that device. In one example, customers are offered five possible queue times to schedule scans of their service 102: Immediate or once daily at 1 AM, 7 AM, 1 PM or 7 PM. Accordingly, after the engine has been invoked for a specified device (step S404), it is determined in step S406 whether a scan of the specified device is currently scheduled. If not, the next device is retrieved from the customer's information (i.e., control is returned to step S404). Otherwise, a scan for the specified device is queued up and executed in random sequence by the scanning engine daemons and threads established during engine startup. These request devices to be scanned from the queue. Each scan continues to run until completed or a time-out due to customer server or network unavailability.

When a scan for the particular device is due to be launched (as determined above in step S406), the first step, as shown by step S408, is to scan all the ports on the device to see which ones are opened, identify which network transport and message protocols are offered on the port, and what services may be listening on the port. The scanning engine will then append the open port information in the customer information database 304 to the historical port scan information already stored there from prior scans.

In one example implementation, the server being tested (e.g. web server associated with website 104) is first pinged using TCP ping to see whether the device is available. To do this, the system can use Nmap, an open source tool managed by www.insecure.org. Using Nmap, the scanning engine attempts to make a full connection to each port and interpret the data returned. This data is stored in database 304. In one example, Nmap is issued with the -n, -p, 1-15000, -sT, -O, -r switches. Specialized scripts can also ping ports using UDP and ICMP services, for example.

Next, in step S410, the scanning engine attempts to find services running on discovered open ports. The Nessus open source engine includes a program to do this. The list of detected services along with the list of open ports is stored in database 304 and can be used in subsequent processing to determine which vulnerability test scripts (.NASL or .NES files) are to be run.

Processing continues to step S412, where the scanning engine selects vulnerability tests to run against the server according to information collected during the port, protocol and service discovery scans run on the device. The worker daemons request queued test jobs from the worker manager process. This continues until all relevant vulnerability tests have been completed. In an example implementation using the Nessus scanning engine, positive test results are stored in a file in XML format.

In step S414, the scan results are parsed by the scanning engine. In the Nessus example implementation, a process parses the XML formatted information and uploads it into database 304. For example, a summary record is created for this scan of this device as well as one detail record for each positive test result associated with this device scan. All results are associated with the device masterfile record as registered in database 304, which is associated with the customer's company account records, also stored in database 304. This data can then be used to calculate a security status for the service 102, and to create interactive reports for inspection by the customer's users.

Upon completion of step S414, processing returns to step S404 for scanning the next device of service 102.

Figure 5:
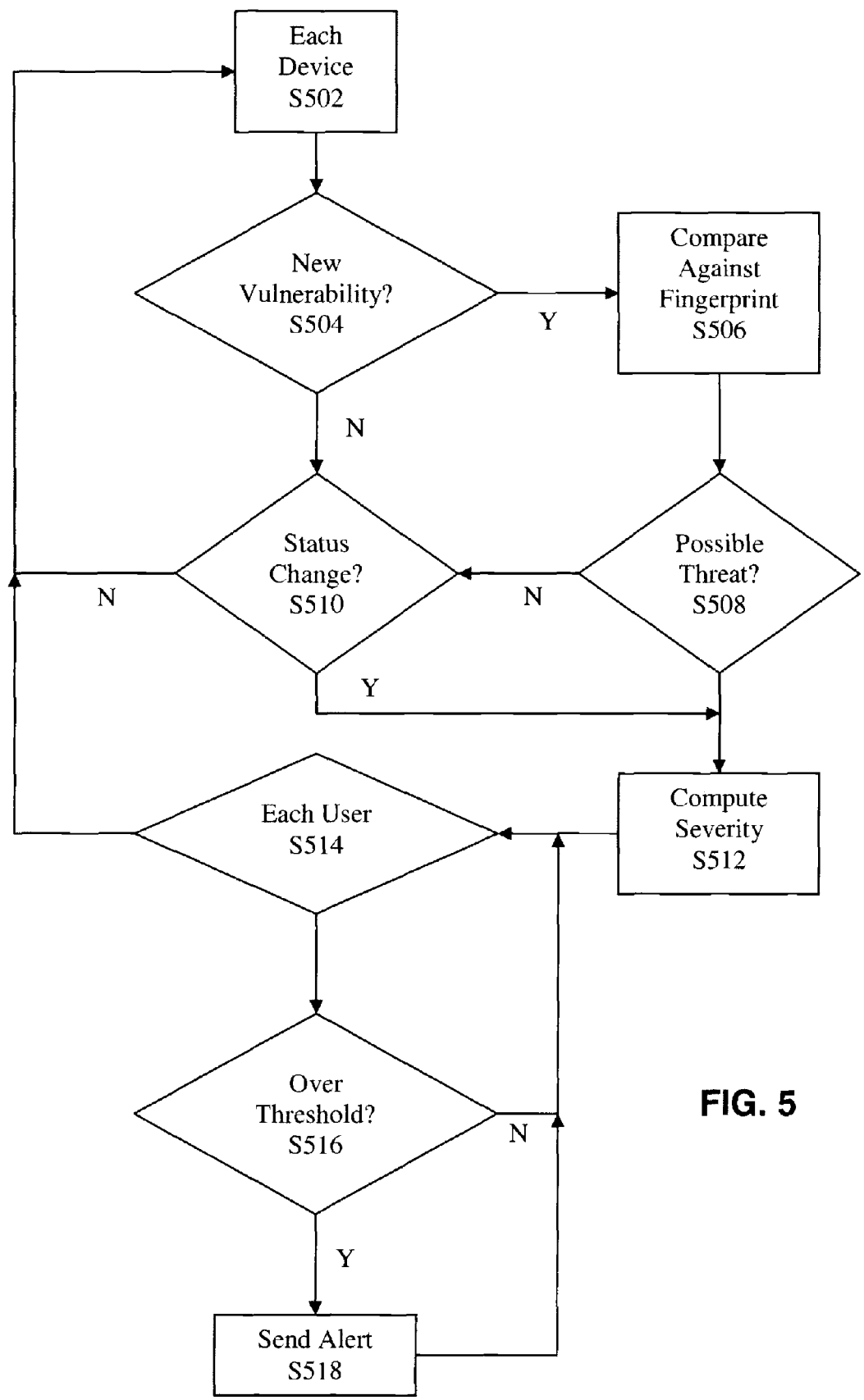
FIG. 5 is a flow diagram illustrating an example of processing steps performed by the alert engine according to an aspect of the invention.

FIG. 5 is a flow diagram illustrating an example of processing steps performed by the alert engine according to an aspect of the invention.

The alert engine helps users of services 102 that are customers of the system 200 stay abreast of their security by sending alert emails when certain events occur on their sites. The security system keeps track of alerts that are sent to users and stores them in database 304.

In one example implementation of the alert engine, the engine continually and periodically loops through each device in the customer's service 102 (determined in step S502, for example, by checking the device information in database 304) to determine if an alert for that device needs to be sent. In one example, an alert is issued under two circumstances. First, an alert can be issued when a new warning of a severe or critical vulnerability is placed in the system. This is detected in step S504. If a new vulnerability has been entered, processing advances to step S506 where the vulnerability fingerprint of the new vulnerability is compared against the device information. The fingerprint includes device information that allows such comparison. For example, if the service includes a device which is a router of a certain brand, and if a new SNMP vulnerability is entered into the system for that particular brand of router, the device may be vulnerable to the new threat. If the new vulnerability is found to potentially affect the device (determined in step S508), an alert may need to be issued, so processing branches to step S512 for determining whether an alert email for the threat should be sent according to the elections of the administrator and users.

An example of how new threats can be entered into the system will now be explained in even further detail. For example, system 200 can include a process that periodically sends a request for new and updated vulnerability test scripts from nessus.org. New scripts are automatically downloaded to a test area, where they are manually modified to incorporate device and other tags meaningful to the system. Another process of system 200 parses the special tags and creates a vulnerability fingerprint record of each new received vulnerability, which record is stored in database 312. The vulnerability fingerprint record can then be used by the alert engine to compare against fingerprint information for all customer devices stored in the customer information database to see if the customer may possibly be exposed to the newly threat. The vulnerability fingerprint record also contains information to identify the severity of the vulnerability, which can be used to calculate the security status for the customer, as will be explained in more detail below.

An example of a second type of trigger for an alert is that a change in security status of a device is detected resulting from a scan of the device (i.e. a security status alert). This is detected in step S510. For example, if this is a new device that was just detected and tested in a scan (as in step S412 in FIG. 4), and if the new device was found to be potentially vulnerable, this information is detected by alert engine 306, and processing branches toward step S512. Moreover, an alert can be sent as soon as a potential negative change in the security status of the device occurs. For example, if a vulnerability with a "critical" level is found, and is not resolved within 48 hours, the service 102's overall security rating is changed from "Secure" to "Active." Another "final warning" alert will be sent within 4 hours of a negative status change. A final Alert will be sent at the time of the status change notifying the user of the change.

In any of these status change events, processing will continue to step S512, where the severity of the security threat is determined. For example, a particular threat can have one of several defined levels in ascending order of severity: note, warning, critical, and severe. In one example, the level associated with the vulnerability is simply contained in the vulnerability fingerprint which is contained in the record in database 312, and simply extracted therefrom.

Processing continues to step S514. Here, a loop for each user of the service 102 is begun. This information is stored in customer information database 304. Each user (possibly also including an administrator) can set up preferences about which devices and what alerts about them to receive. When all the users have been considered for receiving an alert, processing returns to step S502 for checking the next device of service 102 in the loop.

The user preferences are loaded in step S516. Next, the preferences are compared against the device identifier and the severity level of the vulnerability that was computed in step S512. If this is not a level or type of vulnerability that the user wants to receive alerts about, control returns to step S514. Otherwise processing continues to step S518, where an alert is sent to the user. In one example, this is done by placing an alert email in the user's inbox and sending a message containing a URL pointing to the email to the user.

It should be noted that certain types of alerts should not be subject to the threshold determination processing of step S516. For example, security status change alerts may not be allowed to be suppressed. In this case, each alert is placed in the Alert Inbox, but an email saying how many of each type of alert that is received is sent to the user. No alert is sent if there are no vulnerabilities above the threshold the user selects (up to warning).

It should be noted that other types of alert emails can be sent to certain or all users of service 102. For example, an alert can also be sent when a scan has been completed and can contain a simple summary of the scan results, along with a device summary report for each device.

An example of an alert email system will now be described in even further detail. For example, the system administrator of each registered service 102 can elect to allow certain, all or no user to control the alert emails they receive. If allowed, each user can elect to receive various alerts. However, it is preferred that the administrator can never elect to not receive alert emails of a Critical or Severe level. The administrator or user can suppress any level of alert for regular users. The administrator can elect to not receive alert emails at a warning or note level only. In an email implementation, all alerts go to the user's Alert Inbox where they will remain until the user dismisses them, as will be explained in more detail below.

The Summary Alert Inbox contains all alerts that have not been deleted from the inbox. A check box is provided to the left of each alert. The administrator can place a check in the box and then press a "Delete" of the selected alerts button located directly under the check box column in the Alert Inbox. The screen then refreshes with the checked alerts no longer appearing.

The Device Alert Inbox lists only alerts that apply to the a certain device. Alerts can be deleted here by the administrator as well. There should be clear content stating that deleting an alert removes it from the system, so it will not appear in the summary inbox or the device inbox.

When an alert is deleted it is simply marked to not display in any inbox. In one alternative, alert engine includes a function that allows users to look at deleted alerts by entering a date range. For example, it could display a "View History" button above each Alert Inbox with date range input fields. This button would be associated with a CGI allowing a listing of all open alerts between and including those dates.

An Alert Detail display option may be provided to accommodate the two types of alerts in the system. For example, alerts that result from new "potential" vulnerabilities would display an Alert Detail screen containing the generic vulnerability descriptive information. Alerts resulting from scans would provide scan results for that vulnerability in addition to the generic alert information. This is the same as the other Alert detail page except it would have additional fields displaying the detailed scan results obtained during the scan that produced the alert.

Figure 6:
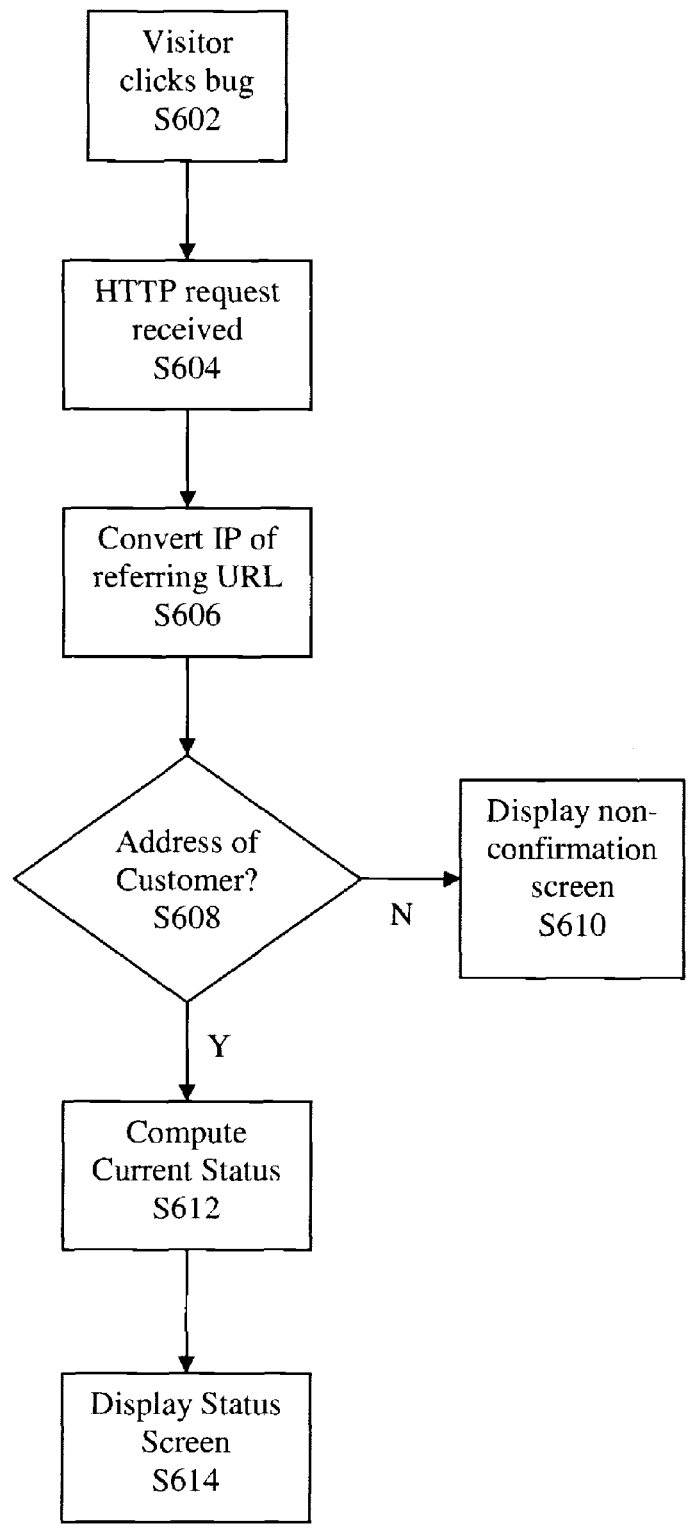
FIG. 6 is a flow diagram illustrating an example of processing performed by the verification engine according to an aspect of the invention.

An example of processing performed by the verification engine according to an aspect of the invention will now be described in connection with FIG. 6.

In one example implementation of the verification engine, services 102 that are registered with the security system 200 are provided a "bug" (e.g. a GIF file with an associated URL) that can be displayed in web pages provided by their website(s) 104. Accordingly, visitors 106 visiting the website(s) will view the "bug," and if they wish to receive third party verification of the security of the website, they can click on the bug. Assuming that is the case (step S602), a URL causes an HTTP request to be made to security system 200, which request is then received by the verification engine 310 of system 200 (step S604). The request also includes the IP address of the referring website 104 that the visitor 106 was visiting. That IP address is extracted in step S606. The address is then compared to the addresses in customer information database 304 corresponding to all registered services 102 of the system. If the extracted IP address does not correspond to any of the stored addresses, a non-confirmation screen is displayed back to the visitor 106 (step S610) informing the visitor that the service 102 is not a scanned service.

If the extracted IP address does correspond to a stored IP address (determined in step S608), the security status information for the associated website is retrieved from customer information database 304. For example, the number of open critical and severe vulnerabilities found on website 104 and when they were found is queried using the extracted IP address. Next, a status level of the website is computed in step S612 and a web page containing this status is provided to the visitor 106 for display on the visitor's web browser (step S614).

One example of how the instantaneous security status of the service 102 in step S612 may be computed is as follows. First, the system checks to see if the service is registered, and if not, the status is set to "Not Protected." If the service 102 is registered, but has no website 104 IP address that has been registered and approved (an example of how to verify whether the registration of a website will be provided below), the status is set to "Pending." If the service has critical or severe vulnerabilities that have been identified and not changed for more than 48 hours (or other period as adjusted in system configuration files), and have not been marked as false positives, the status is set to "Active." If the service has been scanned within the last 72 hours, and has no outstanding critical or severe vulnerabilities that are more than 48 hours old, the status is set to "Secure."

It should be noted that the security status computed in step S612 may not just be based on the result of the last scan performed for the service 102. Rather, the security status presented to visitor 106 can be extrapolated to the moment of the visitor's request. Such an up-to-date security status can be derived by checking the number of vulnerabilities over a certain severity level stored in database 304 for the requested service 102 and applying a grace period for the service 102 to resolve the problem. If sufficient vulnerabilities exist for a long enough period of time, for example, a critical or severe vulnerability unresolved for more than 48 hours, the security status of service 102 can be downgraded. When vulnerabilities are resolved or are identified by service 102 as false positives, the security status is automatically upgraded and displayed the next time a visitor 106 clicks on the Bug found on pages presented by the website 104 of service 102.

The following describes an alternative to the methods and services described above in connection with FIG. 6. Similar to the above example implementation of the verification engine, services 102 that are registered with the security system 200 are provided certain HTML code to allow a "bug" image (e.g. a GIF file with an associated URL), located on security system 200 servers, to be displayed within web pages provided by their website(s) 104. Actions within security system 200 will cause either a security indicator image (i.e. an image saying HACKER SAFE) or a single-dot clear GIF image to be displayed, depending on the current security status of services 102. Accordingly, visitors 106 visiting the website(s) will only be able to view the "bug," when website(s) 102 has a security status meeting certain criteria, and to not see the bug, or to see an alternate bug image, when their security status is below said criteria. Additionally, if visitors 106 wish to receive additional information regarding the security of the website, they can click on the bug when it is made visible. Whenever this certain HTML code located on website(s) 102 causes an HTTP request to be made to security system 200, this request is then received by the verification engine 310 of system 200 (step S604). The request also includes the IP address of the referring website 104 that the visitor 106 was visiting. That IP address is extracted in step S606. The address is then compared to the addresses in customer information database 304 corresponding to all registered services 102 of the system. If the extracted IP address does not correspond to any of the stored addresses, the single-dot clear GIF image, or other alternate image, is displayed back to the visitor 106 (step S610) informing the visitor that the service 102 is not a scanned service.

If the extracted IP address does correspond to a stored IP address (determined in step S608), the security status information for the associated website is retrieved from customer information database 304. For example, the number of open critical and severe vulnerabilities found on website 104 and when they were found is queried using the extracted IP address. Next, a status level of the website is computed in step S612 and if the status level meets certain criteria an indicator bug image, such as an image saying "HACKER SAFE" for example, is provided to the visitor 106 for display on the visitor's web browser (step S614). If, however the status level of the website is computed to be below this certain criteria as computed in step S612, an "invisible" image, such as a single-dot clear GIF image, or other altered image, is provided to the visitor 106 for display on the visitor's web browser (step S614) causing the indicator bug image to seem to disappear, or be altered is some other way, as an indication of the website not meeting said status level.

Figure 9A:
FIGS. 9A and 9B illustrate example security meters for a website that can be displayed to visitors according to one possible implementation of the present invention.
Figure 9B:
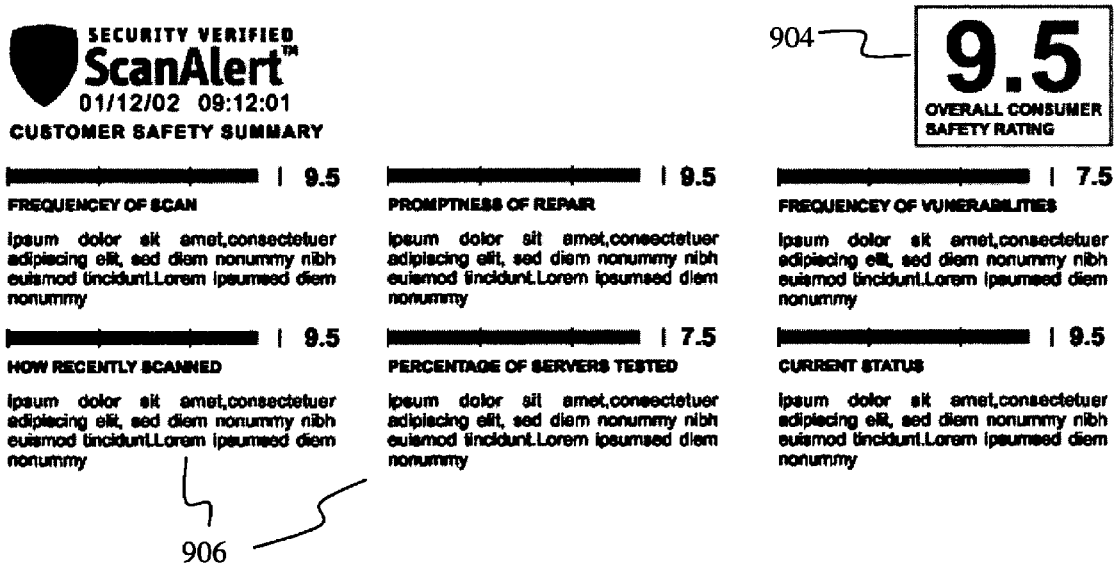

In an example implementation, the security status displayed to the visitor 106 is in the form of a meter (using similar methods such as that explained above with reference to FIG. 6), which is a dynamic graphic that displays the actual security status according to a security scan. One possible implementation of such a security meter is provided in FIG. 9A. As shown in FIG. 9A, the meter 902 includes a bar indicator that merely provides a graphic showing how the status rates on a scale of "Low," "Medium" and "High," which may correspond to "Active," "Pending" and "Secure," as described above. It should be noted that the scale need not only show discrete values, but may indicate values in a continuous range computed by time average of ratings over two previous weeks or otherwise configured period of time, the range being given a normalized numerical scale such as from 0 to 10, for example. Another possible implementation of such a security meter is provided in FIG. 9B. As shown in FIG. 9B, the display is more detailed and includes an overall numeric rating 904, along with several individual security metrics 906 on which the overall rating is based. As shown in FIG. 9B, these can include frequency of scan, promptness of repair, frequency of vulnerabilities, how recently scanned, percentage of servers tested, and current status.

Many other features and advantages of providing such third-party security verification services to the general public, in accordance with the invention, are possible. In this regard, FIG. 8 is a block diagram illustrating an alternative embodiment of the security system 200'.

Figure 8:
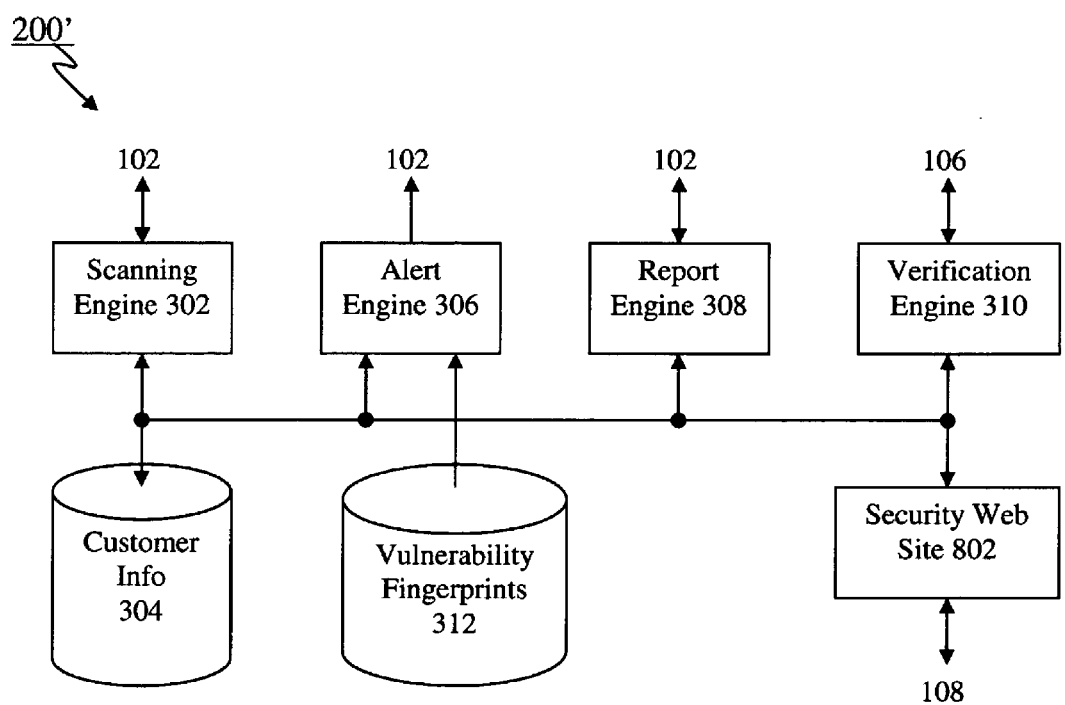
FIG. 8 is a block diagram illustrating an alternative embodiment of the security system of the present invention in detail.
Figure 10:
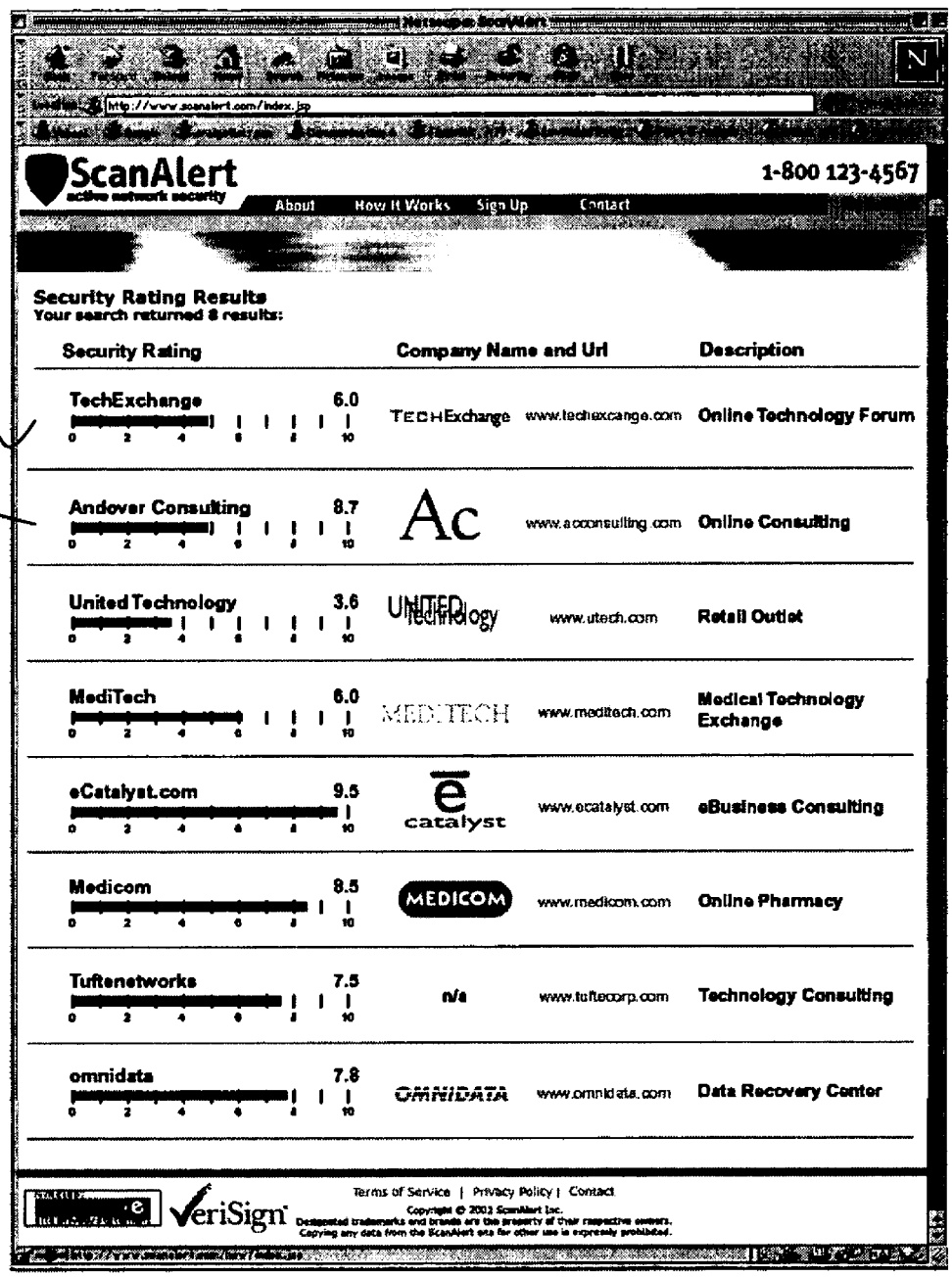
FIG. 10 is an example display of security meters displayed for a plurality of websites to visitors according a further possible implementation of the present invention.

As shown in FIG. 8, security system 200' further includes a security web site 802. The web site 802 responds to general public requests for pages via the Internet or other network 108. In response to such requests for pages, web site 802 retrieves security status information from customer information database 304 and displays it. The security status information can be for a specific website that is registered with system 200', or it can be for all registered websites. In one preferred implementation, the displayed status(es) is (are) in the form of a security meter. One possible example is shown in FIG. 10. As shown in FIG. 10, the display is a web page including a list of websites of interest to the visitor, along with associated meters 1002 showing their overall security status. The meters 1002 can be on a continuous scale computed as set forth above in either of the examples shown in FIGS. 9A and 9B or otherwise. It should be noted that the displayed websites can be selected in a number of ways by the visitor or can be automatically provided.

In a further alternative embodiment, the verification engine can include additional functionality for verifying the registration of the website 104 of a service 102 for permitting third-party verification services for visitors of the website 104. This alternative embodiment will be described in more detail in connection with the flow chart in FIG. 7.

Figure 7:
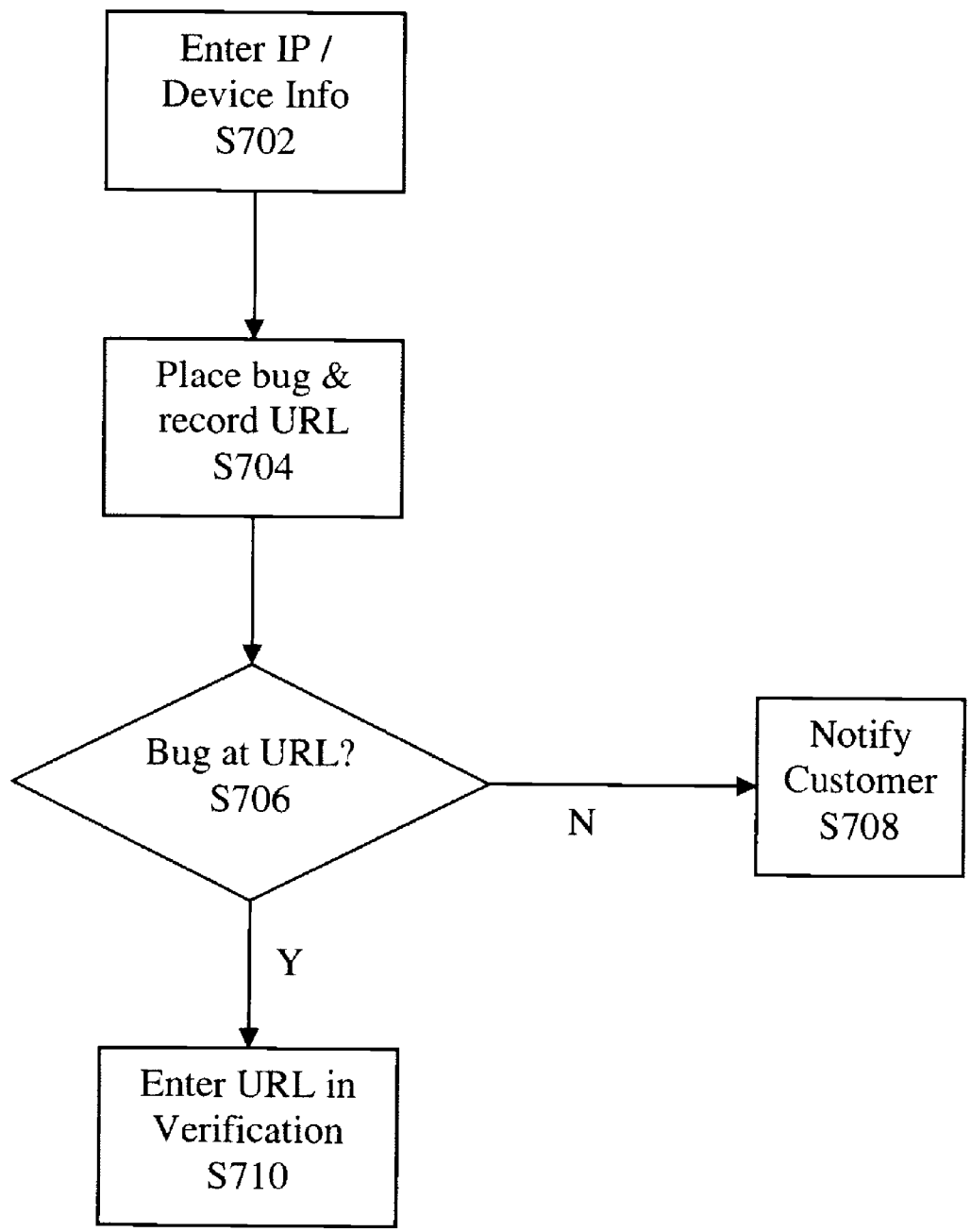
FIG. 7 is a flow diagram illustrating an example of alternative or additional processing performed by the verification engine for verifying the registration of on-line services.

As shown in FIG. 7, a customer whose service 102 is registered with the system 200 logs into the system 200 and enters the IP/device information for the website 104 or other on-line service to make available for third-party security verification by visitors 106 (step S702). At the same time, the service 102 places the "bug" (e.g. a GIF file with an associated URL) provided by the system 200 on a page maintained by the registered IP/device 104, and provides the system 200 with the URL at which the bug is located on the site 104. The verification engine then goes to the URL and determines whether the bug is at the specified location by checking for the filename (step S706). If the bug is not there, a warning is provided by the system 200 to the service 102 (step S708). Otherwise, the registration is confirmed and the information for the service 102 in database 304 is updated accordingly. Thereafter, visitors 106 visiting the site 104 will be able to obtain third-party security verification from system 200 by clicking on the bug.

Although the present invention has been particularly described with reference to the preferred embodiments thereof, it should be readily apparent to those of ordinary skill in the art that changes and modifications in the form and details may be made without departing from the spirit and scope of the invention. For example, those skilled in the art will understand that variations can be made in the number and order of processing steps illustrated in the above flow diagrams. It is intended that the appended claims include such changes and modifications.

What is claimed is:

1. An apparatus for providing a security status of an on-line service, comprising:

a web page object that is automatically rendered by a browser when a visitor uses the browser to access one or more web pages of the on-line service via a public network; and a computer including a verification service that hosts the web page object separately from the one or more web pages of the on-line service, and further controls contents of the web page object, wherein the visitor is not required to take any action other than requesting access to the on-line service via the browser to receive the security status through the automatic rendering of the web page object by the visitor's browser, and wherein the verification service causes the contents of the web page object to be changed in accordance with its prior determination of a level of the security status, such that when the verification service determines, in a first verification operation prior to the visitor's access request, that the on-line service has a first level of the security status, it causes the web page object to have first contents, and when the verification service determines, in a second verification operation prior to the visitor's access request, that the on-line service has a different second level of the security status, it causes the web page object to have different second contents, and thereby automatically controls the visitor's perception of the different security status levels via the browser's automatic rendering of the prior-determined and changed web page object contents when the visitor requests access to the on-line service, and wherein the first and second verification operations to determine the on-line service's security status and control the contents of the web page object are performed by the verification service prior to and completely independently from the visitor's request to access the on-line service, and independently from any action by the visitor and the visitor's browser, and wherein the levels of the security status displayed for the visitor via the automatic rendering of the web page object indicate how vulnerable devices and services of the on-line service are to hackers and other online security threats as determined by the first and second verification operations, and wherein at least one of the first and second verification operations include determining the security status by comparing a fingerprint of a new vulnerability to a stored list of the devices and services and without performing an actual scan or test of the devices and services, and wherein when the verification service causes the web page object to have at least one of the first and second contents, the web page object appears invisible to the visitor after it is rendered by the visitor's browser, and wherein at least one of the first and second verification operations includes scanning the on-line service from a remote address on the network, and wherein the scanning produces a set of XML files including information about open ports, available service, network protocols, security exposures and vulnerabilities, the information associated with a device providing the on-line service, and wherein a scan header record associated with the scanning is stored in a database, the scan header record including a date, launch time, duration and a number of vulnerabilities classified by severity level;

wherein the database stores information about generic services expected to be running on the open ports;

wherein the scanning is performed using a scanning engine of the verification service;

wherein the scanning engine parses the set of XML files and stores records of the parsed set of XML files in the database in association with a device record that is further in association with an account number of a provider of the online service;

wherein the apparatus is operable such that the scanning is performed according to a schedule.

2. An apparatus according to claim 1, wherein the verification service determines the security status level of the on-line service by evaluating a vulnerability scan of the devices and services comprising the on-line service.

3. An apparatus according to claim 2, wherein the verification service periodically receives results of a new vulnerability scan of the devices and services comprising the on-line service and causes the contents of the web page object to be changed if a changed security status level is determined, thereby automatically providing the visitor with an updated security status.

4. An apparatus according to claim 1, wherein the database stores the information about the open ports on the device providing the online service, and actual services running on the open ports, including a version and network message protocol associated with the actual services.

5. An apparatus according to claim 1, wherein the records include a detail record for each positive test result associated with the scanning.

6. An apparatus according to claim 1, wherein the visitor is allowed to log in and review interactive reports associated with the scanning.

7. An apparatus according to claim 1, wherein the levels of the security status displayed for the visitor include a security meter.

8. An apparatus according to claim 1, wherein the levels of the security status displayed for the visitor include an overall numeric rating.

9. An apparatus according to claim 1, wherein the schedule is requested by a customer.

10. An apparatus according to claim 1, wherein information in the database is initialized manually.

11. An apparatus according to claim 1, wherein information in the database is initialized automatically.

12. An apparatus according to claim 1, wherein the scanning is performed on each device registered by the on-line service in the database.

13. An apparatus according to claim 1, wherein the web page object appears invisible to the visitor after it is rendered by the visitor's browser due to a single-dot clear GIF image being provided to the visitor for display on the visitor's browser.

14. An apparatus according to claim 1, wherein the account number of the provider of the online service is associated with the provider's account records.

15. An apparatus according to claim 8, wherein the overall numeric rating has a normalized numerical scale of 0 to 10 and is based on individual security metrics including a frequency of scan, a promptness of repair, a frequency of vulnerabilities, how recently scanned, a percentage of servers tested, and a current status.

16. A method for providing a security status of an on-line service, comprising:

hosting a web page object separately from one or more web pages of the on-line service, utilizing a computer;

providing a link to the web page object so that it is automatically rendered by a browser when a visitor uses the browser to access the one or more web pages of the on-line service via a public network;

providing an indication of the security status of the on-line service to the visitor via the automatic rendering of the web page object by the visitor's browser, wherein the visitor is not required to take any action other than requesting access to the on-line service via the browser to receive the security status; and changing the contents of the web page object to be automatically rendered and displayed in accordance with a determination of a level of the security status, including:

in a first verification operation prior to the visitor's access request, causing the web page object to have first contents if the on-line service has a first level of the security status, and in a second verification operation prior to the visitor's access request, causing the web page object to have different second contents if the on-line service has a different second level of the security status, thereby automatically controlling the visitor's perception of the different security status levels via the browser's automatic rendering of the prior-determined web page object contents when the visitor requests access to the on-line service, wherein the first and second verification operations to determine the on-line service's security Status and control the contents of the web page object are performed prior, to and completely independently from the visitor's request to access the on-line service, and independently from any action by the visitor and the visitor's browser, and wherein the levels of the security status displayed for the visitor via the automatic rendering of the web page object indicate how vulnerable devices and services of the on-line service are to hackers and other online security threats as determined by the first and second verification operations, and wherein at least one of the first and second verification operations include determining the security status by comparing a fingerprint of a new vulnerability to a stored list of the devices and services and without performing an actual scan or test of the devices and services, and wherein, when the web page object is caused to have at least one of the first and second contents, the web page object appears invisible to the visitor after it is rendered by the visitor's browser, and wherein at least one of the first and second verification operations includes scanning the on-line service from a remote address on the network, and wherein the scanning produces a set of XML files including information about open ports, available service, network protocols, security exposures and vulnerabilities, the information associated with a device providing the online service, and wherein a scan header record associated with the scanning is stored in a database, the scan header record including a date, launch time, duration and a number of the vulnerabilities classified by severity level;

wherein the database stores information about generic services expected to be running on the open ports;

wherein the scanning is performed using a scanning engine of the verification service;

wherein the scanning engine parses the set of XML files and stores records of the parsed set of XML files in the database in association with a device record that is further in association with an account number of a provider of the online service;

wherein the scanning is performed according to a schedule.

17. A method according to claim 16, wherein the first and second verification operations include determining the security status level of the on-line service by evaluating a vulnerability scan of the devices and services comprising the on-line service.

18. A method according to claim 17, further comprising periodically receiving results of a new vulnerability scan of the devices and services comprising the on-line service and causing the contents of the web page object to be changed if a changed security status level is determined, thereby automatically providing the visitor with an updated security status.

19. A method according to claim 16, wherein the web page object comprises an image and an associated URL.

20. A method according to claim 16, wherein the web page object comprises a graphical file whose contents are periodically updated in accordance with a periodically determined security status level.

* * * * *